United States Patent
Mallmann et al.

(10) Patent No.: US 8,505,435 B2
(45) Date of Patent: Aug. 13, 2013

(54) TRAVEL LIMITING ELEMENT IN A BRAKE SERVO DEVICE AND BRAKE SERVO DEVICE

(75) Inventors: Markus Mallmann, Pfalzfeld (DE); Michael Possmann, Lahnstein (DE)

(73) Assignee: Lucas Automotive GmbH, Koblenz (DE)

( * ) Notice: Subject to any disclaimer, the term of this patent is extended or adjusted under 35 U.S.C. 154(b) by 894 days.

(21) Appl. No.: 12/531,783

(22) PCT Filed: Feb. 14, 2008

(86) PCT No.: PCT/EP2008/001140
§ 371 (c)(1),
(2), (4) Date: Dec. 3, 2009

(87) PCT Pub. No.: WO2008/113440
PCT Pub. Date: Sep. 25, 2008

(65) Prior Publication Data
US 2010/0102621 A1    Apr. 29, 2010

(30) Foreign Application Priority Data
Mar. 19, 2007 (DE) .......................... 10 2007 013 074

(51) Int. Cl.
*B60T 13/567* (2006.01)
(52) U.S. Cl.
USPC ........................................ 91/369.3; 91/376 R
(58) Field of Classification Search
USPC ................................. 91/369.3, 369.1, 376 R
See application file for complete search history.

(56) References Cited

U.S. PATENT DOCUMENTS

| 4,472,997 A | | 9/1984 | Ohmi |
| 4,951,550 A | * | 8/1990 | Ohki et al. .................... 91/369.3 |
| 4,953,446 A | * | 9/1990 | Fecher et al. ................. 91/369.3 |
| 6,955,044 B1 | * | 10/2005 | Doty ............................ 91/369.2 |
| 7,014,276 B2 | | 3/2006 | Miwa et al. |
| 7,032,497 B2 | | 4/2006 | Krebs et al. |
| 7,255,408 B2 | | 8/2007 | Miwa et al. |
| 2003/0052533 A1 | | 3/2003 | Miwa et al. |
| 2006/0169408 A1 | * | 8/2006 | Rutherford et al. ........... 156/315 |

FOREIGN PATENT DOCUMENTS

| DE | 3210125 A1 | 10/1982 |
| DE | 69005824 T2 | 4/1994 |
| DE | 10238748 A1 | 5/2003 |
| DE | 10203411 A1 | 7/2003 |
| DE | 10342452 A1 | 5/2005 |
| GB | 2296548 A | 7/1996 |

* cited by examiner

*Primary Examiner* — Edward Look
*Assistant Examiner* — Logan Kraft
(74) *Attorney, Agent, or Firm* — MacMillan, Sobanski & Todd, LLC

(57) ABSTRACT

The invention relates to a travel limiting element in a brake booster device for a motor vehicle brake system, comprising a pair of longitudinal legs which are connected together via at least one transverse leg, wherein the travel limiting element can be brought into contact with a stop of the brake booster device. In favor of a simple design and cost-effective production, the travel limiting element comprises two dimensionally stable reinforcement braces which extend along the longitudinal legs, and the transverse leg is made of a damping material which surrounds the two longitudinal legs at least in sections.

19 Claims, 2 Drawing Sheets

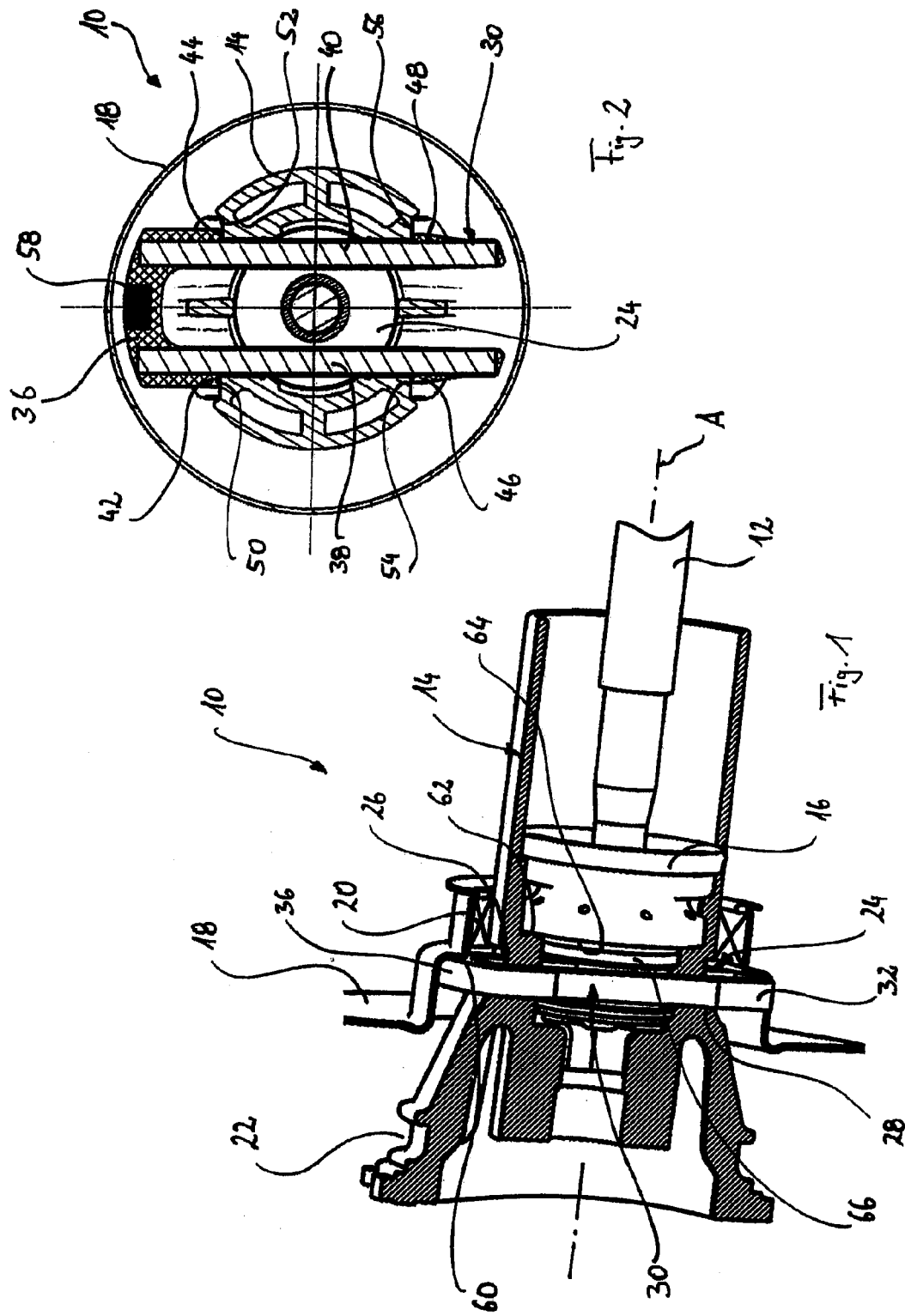

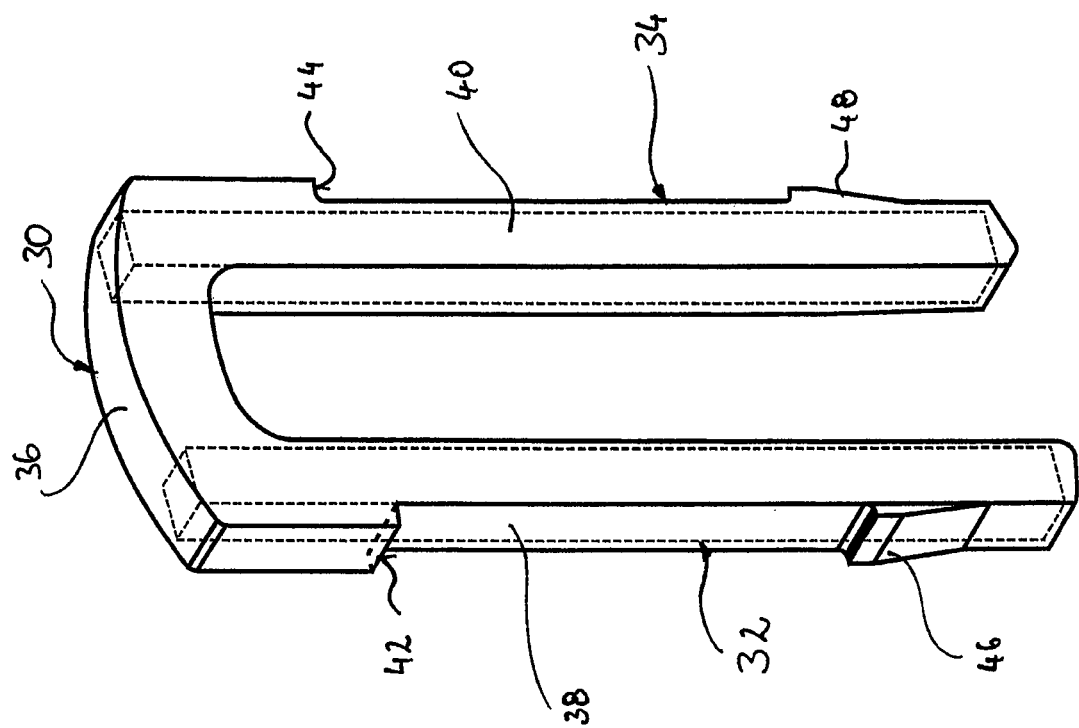

TRAVEL LIMITING ELEMENT IN A BRAKE SERVO DEVICE AND BRAKE SERVO DEVICE

CROSS-REFERENCE TO RELATED APPLICATIONS

This application is a national stage of International Application No. PCT/EP2008/001140 filed Feb. 14, 2008, the disclosures of which are incorporated herein by reference in entirety, and which claimed priority to German Patent Application No. 10 2007 013 074.2 filed Mar. 19, 2007, the disclosures of which are incorporated herein by reference in entirety.

BACKGROUND OF THE INVENTION

The present invention relates to a travel limiting element in a brake booster device for a motor vehicle brake system, comprising a pair of longitudinal legs which are connected together via at least one transverse leg, wherein the travel limiting element can be brought into contact with a stop of the brake booster device.

Travel limiting elements of this kind, also called "crossbars" in technical jargon, are already known from the prior art. Thus the document EP 0 327 997 A2 presents a pneumatic brake booster of tandem design in which the transmission piston arrangement is constructed with a crossbar. This crossbar is in contact with the booster housing when the brake booster is in a starting position. It can be displaced together with the control piston arrangement in an opening inside the control valve housing. It thereby on the one hand limits the relative movement between the control piston arrangement and the control valve housing and on the other guarantees a defined starting position by bearing against an associated stop on the housing wall.

The mode of operation of brake boosters of this kind and in particular the function of a travel limiting element of this kind, called a crossbar, are well-known in the prior art.

Also to be referred to as prior art is the document DE 103 42 452 A1, which presents a comparable crossbar.

It has become apparent that crossbars of this kind have to bear relatively large loads, so that they must be made of an appropriately stable material, in particular of a heavy tough metal material. Crossbars of this kind are usually made in a stamping production process. Since, as described above, the crossbars come into and out of contact with different stops on the housing of the brake booster as well as on the control valve housing during operation, when the crossbars are of a purely metallic construction undesirable noises occur during operation, i.e. upon actuating the brake. In order to prevent noises of this kind, attempts have in the past been made to provide the crossbars or the stops with an appropriately noise-damping coating, which has made production more complicated and expensive.

As opposed to this, a feature of the present invention is to provide a travel limiting element of the type initially described which, while being of a simple and cost-effective design, nevertheless affords sufficient stability for absorbing the occurring forces.

BRIEF SUMMARY OF THE INVENTION

This features is achieved by a travel limiting element of the type initially described in which the travel limiting element comprises two dimensionally stable reinforcement braces which extend along the longitudinal legs, and the transverse leg is made of a damping material which surrounds the two longitudinal legs at least in sections.

According to the invention, the travel limiting element is accordingly designed so that the load-bearing sections are reinforced by the reinforcement braces, that, however, these are already embedded in the transverse leg so that sufficient dimensional stability of the travel limiting element is achieved, with this at the same time being formed so as to be lighter and noise-damping in the relevant areas.

The reinforcement braces can be designed according to requirements. Thus it is possible for the reinforcement braces to have a differing material thickness. The particular advantage of using rectilinear reinforcement braces lies in the fact that—other than in the case of the prior art—no special shaping by stamping or forming is required. Instead, according to one development of the invention, reinforcement braces of metal, in particular of drawn longitudinal steel or wire material can be used, in which case no special requirements have to be met by the surface quality of the material. It is alternatively possible for the reinforcement braces to consist of plastics material, in particular of tough or fibre-reinforced or body-reinforced plastics material. It is thus possible to produce the travel limiting element from sufficiently tough plastics material and to achieve a significant weight saving when compared with conventional metallic travel limiting elements according to the prior art.

It is also possible according to the invention for the damping material to be constituted by a partially elastic or an elastomeric plastics material. When selecting the damping material, particular attention should be paid to preventing the occurrence of undesirable noises in consequence of the stop action. According to one constructional variant, the damping material can be fibre-reinforced or body-reinforced. The stability of the travel limiting element according to the invention is further increased as a result. The toughness thereof can also be increased by adding suitable chemical additives.

According to one advantageous embodiment of the invention, the reinforcement braces are completely embedded in the damping material. In this connection the advantage of the low requirements to be met by the surface quality of the reinforcement braces, which is relevant in terms of the production costs, is again to be emphasised. By completely embedding the reinforcement braces in the damping material, it is also possible to use reinforcement braces of cost-effective longitudinal steel, for example with a square profile, which have an untreated surface and are therefore particularly cost-effective in terms of acquisition.

A further advantage of the "built-up" construction of the travel limiting element according to the invention lies in the fact that a component of a displacement sensor, in particular a magnet of a Hall sensor, can be embedded in the transverse leg, which can be made of the elastomeric material, for example by injection moulding or similar. In this variant of the invention the displacement sensor component can advantageously be coupled to the transmission piston device in a space-saving and at the same time protected manner, so that any movement of the transmission piston device and therefore of the force input member can be detected. Additional magnet holders or similar, as are known to the person skilled in the art from the prior art, can therefore be avoided, which further simplifies the production as well as the design of the brake booster.

The travel limiting element is usually inserted from above in an opening in the control valve housing when assembly takes place. According to one development of the invention, in order to simplify this process and to clearly define the assembly position of the travel limiting element according to the invention, at least one stop formation is provided on or near the transverse leg and at least one locking tooth formation is provided on the longitudinal legs. The stop formation serves to position the travel limiting element in a defined position transversely to the longitudinal direction of the brake booster device. In this defined position the at least one locking tooth formation then locks with a corresponding mating locking tooth formation, for example on the control valve housing, so that there is no possibility of the travel limiting element inadvertently coming loose. In this connection it is preferable for the stop formation and/or the locking tooth formation to be made of the damping material and moulded onto the transverse leg as well as onto the longitudinal legs. This also enables the production of the travel limiting element according to the invention to be simplified, as the stop formation and/or the locking tooth formation can be subsequently formed by moulding onto the connecting braces. In the prior art corresponding formations are constituted by material sections obtained through the stamping process or through forming processes.

The invention also relates to a brake booster device for a motor vehicle brake system with a travel limiting element of the type described above.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a partial longitudinal view of a control valve housing as well as components of a brake booster device, which surround the latter, according to the present invention;

FIG. 2 is a cross-sectional view of the arrangement according to FIG. 1 in the area of the travel limiting element; and FIG. 3 is a perspective component representation of the travel limiting element according to the invention.

DETAILED DESCRIPTION OF THE INVENTION

In FIG. 1 a part of a brake booster device according to the invention is represented in a partial longitudinal section and generally marked by 10. This comprises a force input member 12 which is coupled to a brake pedal in a manner which is not shown at its end side which is cut off in FIG. 1. The force input member 12 is inserted in a control valve housing 14. It is coupled to a valve element 16 for joint movement. The control valve housing 14 is accommodated in a booster housing 18 and displaced along the longitudinal axis A in the latter in a sealing manner via a seal 20. The control valve housing 14 is coupled in a conventional manner to a moveable wall, which is not shown, in an area 22.

The control valve housing 14 also defines an opening 24 which is bounded by two stops 26 and 28 (partly concealed). It can be seen in FIG. 2 that the opening 24 extends centrally through the control valve housing 14.

A travel limiting element 30 according to the invention is accommodated in the opening 24. This is formed approximately in the shape of a horseshoe, so that, as can be seen in particular in FIG. 2 and in FIG. 3, it comprises two longitudinal legs 32 and 34 and a transverse leg 36 which connects these. The travel limiting element 30 is composed of two reinforcement braces 38 and 40, which are drawn in broken lines in FIG. 3. In the embodiment which is shown these reinforcement braces 38, 40 are embedded in an elastic rubber material, which at the same time constitutes the transverse leg 36. This elastic rubber material completely surrounds the reinforcement braces 38 and 40, which are made of a square steel.

The elastic rubber material forms stop shoulders 42 and 44 in the area of the transverse leg 36 to the side of the longitudinal legs 32, 34. Locking tooth formations 44 and 46 are provided in the area of the free ends of the longitudinal legs 32 and 34 near the ends and are bevelled towards the free ends of the longitudinal legs 32 and 34.

As shown by FIGS. 1 and 2, a travel limiting element 30 of this kind is pushed onto the control valve housing 14 when the brake booster device 10 according to the invention is assembled, so that the two stop shoulders 42 and 44 on corresponding stop surfaces 50 and 52 in the upper area of the control valve housing 14 bear against the opening 24. In this state the locking tooth formations 46 and 48 engage behind mating locking surfaces 54 and 56 on the control valve housing 14.

The sectional view according to FIG. 2 again shows that the reinforcement braces 38 and 40 are completely embedded in the rubber material, which also constitutes the transverse leg 36. A magnet 58 is also embedded in the transverse leg 36, which magnet is part of a Hall sensor for detecting the instantaneous position of the transverse leg 36 and relative movements.

Turning now to FIG. 1 again, it can be seen that in the starting position which is shown in FIG. 1 the travel limiting element 30 is in contact both via its transverse leg 36 and via the free ends of the longitudinal legs 32 and 34 with a stop 60 which is in the form of a diametral shoulder in the booster housing 18. Two sealing seats 62 as well as a part of a control piston 66 can also be seen.

As already stated, the brake booster 10 functions like a conventional brake booster, i.e. in the same way as already mentioned with respect to the prior art initially cited. The essential factor in this connection is that in the starting position which is shown in FIG. 1 the travel limiting element 30 bears against the stop 60 of the booster housing 18 and thus establishes the starting position of the control valve housing 14 relative to the booster housing 18. In addition to this it also defines a relative movement between the control valve housing 14 and the control piston 66 in a conventional manner, with the two valve seats 62 and 64 being opened or closed according to the mode of actuation.

Due to the configuration according to the invention of the travel limiting element 30, this can be produced easily and with a low expenditure. In particular the fact that the functional surfaces such as, for instance, the stop shoulders 42 and 44 as well as the locking tooth formations 46 and 48 are made of plastics material affords a wide variety of configurations at a low technical expenditure and a low cost input. The fact that square elements which are obtainable as standard can be used as reinforcement braces also simplifies the design and production. The stop surfaces which are active during operation, in particular those surfaces which interact with the stop step 60 on the booster housing 18 as well as with the stops 26 and 28 on the control valve housing, are covered with damping elastomeric material, so that no undesirable noises occur.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Travel limiting element in a brake booster device for a motor vehicle brake system, comprising a pair of longitudinal legs which are connected together via at least one transverse leg, wherein the travel limiting element can be brought into contact with a stop of the brake booster device, wherein the travel limiting element further comprises two dimensionally stable reinforcement braces which are distinct and different from the pair of longitudinal legs and are configured to reinforce the load bearing sections of the travel limiting element and which are disposed in a manner such that a respective one of the two dimensionally stable reinforcement braces extends along at least a portion of a respective one of the pair of longitudinal legs, and that the transverse leg is made of a damping material which surrounds the two longitudinal legs at least in sections.

2. Travel limiting element according to claim 1, wherein the reinforcement braces consist of metal.

3. Travel limiting element according to claim 1, wherein the reinforcement braces consist of plastics material.

4. Travel limiting element according to claim 1, wherein the damping material is constituted by a partially elastic or an elastomeric plastics material.

5. Travel limiting element according to claim 4, wherein the damping material is fibre-reinforced.

6. Travel limiting element according to claim 1, wherein the reinforcement braces are completely embedded in the damping material.

7. Travel limiting element according to claim 1, wherein a component of a displacement sensor is provided in the transverse leg.

8. Travel limiting element according to claim 1, wherein at least one stop formation is provided on or near the transverse leg, and that at least one locking tooth formation is provided on the longitudinal legs.

9. Travel limiting element according to claim 8, wherein at least one of the at least one stop formation and the at least one locking tooth formation are made of the damping material and moulded onto the transverse leg as well as onto the longitudinal legs.

10. Travel limiting element according to claim 2, wherein the metal is a drawn longitudinal steel or wire material.

11. Travel limiting element according to claim 3, wherein the plastics material is a fibre-reinforced or body-reinforced plastics material.

12. Travel limiting element according to claim 7, wherein the component is a magnet of a Hall sensor.

13. A brake booster device for a motor vehicle brake system comprising;
a booster housing having a stop;
a control valve housing accommodated in the booster housing; and
a travel limiting element accommodated in the control valve housing, the travel limiting element having a pair of longitudinal legs which are connected together via at least one transverse leg, wherein the travel limiting element can be brought into contact with the stop of the booster housing;
wherein the travel limiting element further includes two reinforcement braces which are distinct and different from the pair of longitudinal legs and are configured to reinforce the load bearing sections of the travel limiting element and which are disposed in a manner such that a respective one of the two dimensionally stable reinforcement braces extends along at least a portion of a respective one of the pair of longitudinal legs and wherein the transverse leg is made of a damping material which surrounds the two longitudinal legs.

14. The brake booster device of claim 13, wherein the reinforcement braces consist of metal.

15. The brake booster device of claim 13, wherein the reinforcement braces consist of plastics material.

16. The brake booster of claim 13, wherein the reinforcement braces are completely embedded in the damping material.

17. The brake booster of claim 13, wherein a component of a displacement sensor is provided in the transverse leg.

18. The brake booster device of claim 13, wherein at least one stop formation is provided on or near the transverse leg, and that at least one locking tooth formation is provided on the longitudinal legs.

19. The brake booster device of claim 18, wherein at least one of the at least one stop formation and the at least one locking tooth formation are made of the damping material and moulded onto the transverse leg as well as onto the longitudinal legs.

* * * * *